United States Patent
Kume et al.

[11] Patent Number: 5,981,416
[45] Date of Patent: Nov. 9, 1999

[54] TITANIUM NITRIDE ALUMINUM BASED SINTERED MATERIAL AND ITS PRODUCTION METHOD

[75] Inventors: Shoichi Kume, Tsushima; Kazutaka Suzuki, Komaki; Yoshinori Nishida, Kasugai; Haruo Yoshida, Tsukuba; Yasuhiro Enya, Chiryu; Akinari Ishikawa; Takashi Sakurai, both of Kariya, all of Japan

[73] Assignees: National Industrial Research Institute of Nagoya, Nagoya, Japan; Aisin Seiki Kabushiki Kaisha, Kariya, Japan

[21] Appl. No.: 08/997,732

[22] Filed: Dec. 24, 1997

[30] Foreign Application Priority Data

Dec. 25, 1996 [JP] Japan ..................... 8-357214

[51] Int. Cl.$^6$ ..................... C04B 35/58

[52] U.S. Cl. ................ 501/96.1; 501/96.2; 501/98.4

[58] Field of Search ................. 501/98.4, 96.1, 501/96.2

[56] References Cited

FOREIGN PATENT DOCUMENTS

| 0 701 982 | 3/1996 | European Pat. Off. . |
| 0701982 | 3/1996 | European Pat. Off. . |
| 5-78107 | 3/1993 | Japan . |
| 50178107 | 3/1993 | Japan . |

*Primary Examiner*—Paul Marcantoni
*Attorney, Agent, or Firm*—Oblon, Spivak, McClelland, Maier & Neustadt, P.C.

[57] ABSTRACT

The purpose of the present invention is to provide a titanium nitride aluminum based sintered material having excellent durability and able to be cheaply produced and cut spheroidal graphite cast iron at high speed and be used as a cutting tool material having a long life, and a method of production the same. The present invention resides in a production method of a titanium nitride aluminum based sintered material characterized in that powder of $Ti_{(1-x)}Al_xN$ (x=0.05~0.70) is sintered. Said x is preferably set to a range from 0.05 to 0.15 or from 0.50 to 0.70. 0.2 to 11.1% of an additive by volume constructed by $TiO_y$ (y=1~2) and/or $Al_2O_3$ is preferably externally added to the above titanium nitride aluminum based sintered material.

22 Claims, 2 Drawing Sheets

1

TITANIUM NITRIDE ALUMINUM BASED SINTERED MATERIAL AND ITS PRODUCTION METHOD

BACKGROUND OF THE INVENTION

1. Field of the Invention

The present invention relates to a titanium nitride aluminum based sintered material effectively utilizable as the material of a tool for high speed cutting spheroidal graphite cast iron, etc., and a production method of this titanium nitride aluminum based sintered material.

2. Description of the Related Arts

The spheroidal graphite cast iron is cast iron in which spheroidal graphite is crystallized by adding cerium (Ce) or magnesium (Mg) (or a Mg alloy) into a molten bath of low sulfur (S) (<0.02%) and low phosphorus (P) (<0.2%). The spheroidal graphite cast iron has high tensile strength and relatively large tenacity in comparison with common cast iron. Therefore, the spheroidal graphite cast iron is widely used as a material of mechanical parts requiring strength and is also used in many cases as trunk important parts mainly constituting an automobile by its recent higher performance.

Cutting work of the spheroidal graphite cast iron is normally required after casting to set this spheroidal graphite cast iron to have a final shape size of the above trunk important parts, etc. A cutting work tool of the spheroidal graphite cast iron must have performance capable of rapidly processing this spheroidal graphite cast iron without any waste with required processing accuracy. When a tool edge is worn and damaged by chipping, etc., fins are caused on a processing surface of the spheroidal graphite cast iron, etc. so that no required size accuracy and surface roughness are obtained. Accordingly, a defective product is formed so that this defective product cannot be forwarded as manufactured goods.

Therefore, when the above tool wearing and chipping damage, etc. are caused, the cutting work tool must be immediately exchanged. This tool exchange must be reduced as much as possible since this tool exchange causes a reduction in productivity. Further, when production cost of the above cutting work tool is high even if life of this tool can be lengthened, processing cost of the cutting work tool rises as a result.

Accordingly, a cutting work tool having a long life and cheaply manufactured without any wearing nor damages of the above tool edge by chipping, etc., is strongly desired to cut the spheroidal graphite cast iron at high speed with reduced processing cost mentioned above.

For example, a ceramic sintered body constructed by TiC, $Al_2O_3$ and SiC whiskers as described in Japanese Published Patent No. 8-16028 is proposed as a cutting work tool for solving the above disadvantages.

However, there are the following problems with respect to a sintered material used in the above conventional cutting tool, etc.

Namely, no expensive cubic boron nitride as a high hardness material is included in the ceramic sintered body constructed by the above TiC, $Al_2O_3$ and SiC whiskers. Therefore, there is a merit in that the ceramic sintered body can be cheaply manufactured. However, no ceramic sintered body can have durability for realizing a long life at a desired level. In particular, no satisfied durability can yet be obtained with respect to the spheroidal graphite cast iron including magnesium (Mg) and difficult to be processed.

SUMMARY OF THE INVENTION

In consideration of such conventional problem points, the present invention provides a titanium nitride aluminum based sintered material having excellent durability and able to be cheaply manufactured and cut spheroidal graphite cast iron at high speed and be used as a cutting tool material having a long life, and also provides a production method of this titanium nitride aluminum based sintered material.

The present invention resides in a production method of a titanium nitride aluminum based sintered material characterized in that powder of $Ti_{(1-x)}Al_xN$ (x=0.05~0.70) is sintered.

The most noticeable features of the present invention are that the powder of the titanium nitride aluminum ($Ti_{(1-x)}Al_xN$ (x=0.05~0.70)) in a specific composition range is used as a raw material and is sintered.

The above $Ti_{(1-x)}Al_xN$ (x=0.05~0.70) has the crystal structure of a B1 type, which is one of the cubic system, similar to that of TiN. However, aluminum (Al) is continuously solid-soluble in a TiN crystal so that this $Ti_{(1-x)}Al_xN$ (x=0.05~0.70) has excellent physical properties different from those of TiN. An oxidation resisting property is improved or hardness is increased within a range of the above x from 0.05 to 0.70.

In contrast to this, when this x is smaller than 0.05, a problem exists in that this $Ti_{(1-x)}Al_xN$ is not substantially different from TiN and cannot show the above excellent physical properties. When the above x exceeds 0.70, a problem exists in that no crystal structure of $Ti_{(1-x)}Al_xN$ has the B1 type cubic system and no $Ti_{(1-x)}Al_xN$ (x=0.05~0.70) can show the above excellent physical properties.

DETAILED DESCRIPTION OF THE INVENTION

Figure 1:
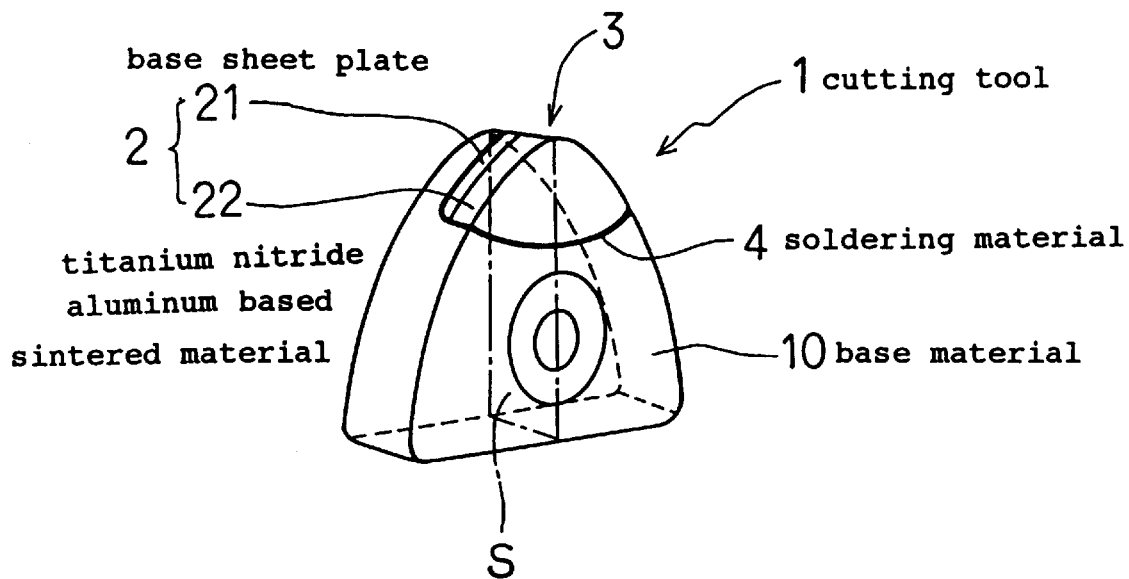
FIG. 1 is a perspective view of the cutting tool according to Embodiment 1.

Titanium nitride aluminum ($Ti_{(1-x)}Al_xN$ (x=0.05~0.70) in the above specific composition range can be produced by various kinds of methods.

For example, the titanium nitride aluminum ($Ti_{(1-x)}Al_xN$ (x=0.05~0.70) is evaporated on the surface of a substrate material such as $SiO_2$, MgO, etc. by a physical vapor deposition (PVD) method. Thereafter, the substrate material is dissolved by an alkali or an acid and the remaining $Ti_{(1-x)}Al_xN$ (x=0.05~0.70) is next crushed to powder.

In the above PVD method, for example, there are a sputtering method and an ion plating method executed under a nitrogen pressure reducing atmosphere with titanium (Ti) and aluminum (Al) as targets.

A chemical vapor deposition (CVD) method can be also used instead of the above PVD method. Concretely, for example, there is a plasma CVD method in which $TiCl_4$, $AlCl_3$ and $NH_3$ or $N_2$ (suitably $N_2$) are used as a raw material gas, and argon (Ar) and $H_2$ are used as a carrier gas.

For example, in the case of said PVD method (the sputtering method and the ion plating method), in order to adjust the above x to a range from 0.05 to 0.70, a plate material constituted of an alloy whose composition in which a mole ratio of Ti:Al ranges from 0.30:0.70 to 0.95:0.05 is prepared by a powder metallurgy method. This plate material is used as a target. Or otherwise, a titanium plate material and an aluminum plate material are prepared, and then arranged such that an area ratio of Ti:Al ranges from 0.30:0.70 to 0.95:0.05, converting into a mole ratio. These titanium and aluminum plate materials are used as targets.

Further, for example, an $N_2$ partial pressure is adjusted in a range from $1 \times 10^{-3}$ to $1 \times 10^{-1}$ Pa in an atmosphere at a PVD processing time. When this $N_2$ partial pressure is smaller than $1 \times 10^{-3}$ Pa, a problem exists in that titanium and aluminum are not nitrided. In contrast to this, when the above $N_2$ partial pressure exceeds $1 \times 10^{-1}$ Pa, a problem exists in that AlN is generated. Therefore, it is desirable to preferably set the $N_2$ partial pressure to about $1 \times 10^{-2}$ Pa. Argon (Ar) is used as a gas for generating a plasma.

In the case of the plasma CVD method, the above x is adjusted to a range from 0.05 to 0.70 by adjusting a gaseous partial pressure ratio of $AlCl_3/TiCl_4$. A boiling point of $AlCl_3$ is 183° C. under 100.4 kPa, $AlCl_3$ is heated to a temperature equal to or higher than this boiling point to hold its gaseous state in a range from 4.0 to 101.1 kPa and is supplied into CVD device. However, since the boiling point is reduced under a reduced pressure, $AlCl_3$ can be held in a gaseous state even at about 150° C. in the case of e.g., about 5.0 kPa.

$TiCl_4$ is adjusted in a range from 4.0 to 101.1 kPa. When the partial pressure of this $TiCl_4$ is low (e.g., about 5 kPa), it is not necessary to heat the above materials. In contrast to this, when the partial pressure of $TiCl_4$ is adjusted to a higher pressure equal to or higher than several 10 kPa, it is necessary to heat the above materials in advance to hold the gaseous state. It is necessary to heat flowing passages of these gases to a temperature equal to or higher than at least the above temperature so as to prevent condensation of these gases.

It can be checked by an energy diffusive type X-ray analysis whether or not the value x of the obtained $Ti_{(1-x)}Al_xN$ lies in a predetermined range. Further, a change in crystal structure recognized in the case of the above x exceeding 0.70 can be checked by X-ray diffraction.

A particle diameter of powder of the above $Ti_{(1-x)}Al_xN$ (x=0.05~0.70) is preferably set to be equal to or smaller than 10 $\mu$m. When this particle diameter exceeds 10 $\mu$m, a problem exists in that chipping tends to be caused as a tool material during cutting work. When this powder is crushed, it is necessary to allow impurities not to mix with the above powder.

Next, for example, the powder of the above $Ti_{(1-x)}Al_xN$ (x=0.05~0.70) can be sintered by a hot press (HP) method, a well-known HIP (hot isotropic pressing) method, an ultra-high pressure HIP method, etc.

An operation of the present invention will next be explained.

In a production method of the titanium nitride aluminum based sintered material in the present invention, the powder of $Ti_{(1-x)}Al_xN$ (x=0.05~0.70) having the above specific composition is used as a raw material and is sintered. This $Ti_{(1-x)}Al_xN$ shows excellent characteristics such as high hardness, etc. within a range of the value x from 0.05 to 0.70. Therefore, the obtained titanium nitride aluminum based sintered material has very excellent durability.

Further, no titanium nitride aluminum based sintered material of the present invention has a conventionally known expensive high hardness material such as a cubic boron nitride, etc. so that this titanium nitride aluminum based sintered material can be cheaply produced.

Therefore, for example, the titanium nitride aluminum based sintered material obtained in the present invention can be effectively utilized in a cutting tool, a pit for drilling, etc. as a material having durability and cheaply produced. For example, when the titanium nitride aluminum based sintered material is used in a cutting tool for spheroidal graphite cast iron, this cutting tool can be set to a cutting tool capable of performing high speed cutting and cheaply manufactured and having an excellent wear resisting property and an excellent chipping-damage resisting property.

The next invention is a production method of the titanium nitride aluminum based sintered material having excellent durability.

Namely, there is a production method of the titanium nitride aluminum based sintered material characterized in that a raw material including 60 to 95% of $Ti_{(1-x)}Al_xN$ (x=0.05~0.70) by volume and 5 to 40% of TiC whiskers by volume is sintered.

The most noticeable contents in this production method are that the above TiC whiskers are used as a raw material of the sintered material in addition to the above $Ti_{(1-x)}Al_xN$ (x=0.05~0.70), and a compounding ratio of each of these raw material bodies is limited to the above specific range.

The above TiC whiskers are mainly utilized as a dispersing reinforcement of a composite material as a material having very high hardness, a high melting point and an excellent wear resisting property. A compounding ratio of these TiC whiskers is set to range from 5 to 40% by volume as mentioned above.

When the TiC whiskers are included in the sintered material in a compounding ratio equal to or greater than 5%, effects provided by compounding the TiC whiskers appear so that higher tenacity is obtained and it is effective to lengthen the life of the sintered material. However, when the TiC whiskers are included in the sintered material in a compounding ratio greater than 40%, a problem exists in that it is difficult to relatively make the TiC whiskers close since the TiC whiskers have the high hardness and the high melting point and are difficult to be sintered.

Further, for these reasons, the compounding ratio of the above $Ti_{(1-x)}Al_xN$ (x=0.05~0.70) is set to range from 60 to 95% by volume. When this compounding ratio is smaller than 60%, a problem exists in that the TiC whiskers are relatively increased and no life of the sintered material can be lengthened. An upper limit of the above compounding ratio is set to 95% since dispersing effects of the TiC whiskers appear in its compounding ratio equal to or greater than 5% by volume as mentioned above.

The above raw material may be constructed by mixing the above TiC whiskers with the powder of $Ti_{(1-x)}Al_xN$ (x=0.05~0.70). Otherwise, as described later, the above raw material may be constructed by a covered body in which the TiC whiskers are covered with $Ti_{(1-x)}Al_xN$ (x=0.05~0.70). Further, the above raw materials may be constructed by mixing the powder of $Ti_{(1-x)}Al_xN$ (x=0.05~0.70) with this covered body.

As mentioned above, the TiC whiskers are compounded as a dispersing reinforcement in the case of this production method. Therefore, the obtained titanium nitride aluminum based sintered material shows further excellent tenacity in comparison with a case in which this titanium nitride aluminum based sintered material is constructed by only $Ti_{(1-x)}Al_xN$ (x=0.05~0.70). Therefore, for example, when the obtained titanium nitride aluminum based sintered material is used as a cutting tool material, this titanium nitride aluminum based sintered material shows a very excellent cutting property and very excellent durability when this titanium nitride aluminum based sintered material is used as a cutting tool material.

There is also a production method of the titanium nitride aluminum based sintered material characterized in that a covered body is manufactured by covering surfaces of the TiC whiskers with $Ti_{(1-x)}Al_xN$ (x=0.05~0.70) and is sintered.

The most noticeable contents of this production method are that the above covered body is produced in advance and is sintered as a raw material.

Thus, it is possible to easily obtain a sintered material in which the TiC whiskers are uniformly dispersed in $Ti_{(1-x)}Al_xN$ (x=0.05~0.70).

For example, the above covered body can be produced by directly generating $Ti_{(1-x)}Al_xN$ (x=0.05~0.70) on the surfaces of the TiC whiskers using the above production method of $Ti_{(1-x)}Al_xN$ (x=0.05~0.70). Namely, a saucer arranging the TiC whiskers is used instead of the above substrate in each of the above PVD and CVD methods. The covered body can be obtained by evaporating $Ti_{(1-x)}Al_xN$ (x=0.05~0.70) to these TiC whiskers.

For example, a gaseous phase covering method clearly shown in the production method of a covering high pressure phase boron nitride sintered body described in Japanese Laid-Open Patent No. 7-53268 can be preferably used to uniformly form the covered body. Otherwise, a gaseous phase covering method described in Japanese Laid-Open Patent No. 61-30663 or 58-31076 may be also used.

The above covered body preferably includes 60 to 95% of the above $Ti_{(1-x)}Al_xN$ (x=0.05~0.70) by volume and 5 to 40% of the above TiC whiskers by volume.

In this case, when the compounding ratio of the TiC whiskers is smaller than 5%, a problem also exists in that no effects provided by compounding the TiC whiskers clearly appear. In contrast to this, when the compounding ratio of the TiC whiskers exceeds 40%, a problem exists in that it is difficult to relatively make the TiC whiskers close since the TiC whiskers have high hardness and a high melting point and are difficult to be sintered.

When the compounding ratio of the above $Ti_{(1-x)}Al_xN$ (x=0.05~0.70) is smaller than 60%, the above TiC whiskers are relatively increased so that it is difficult to make the TiC whiskers close as mentioned above.

The next invention is a method for sintering a mixing raw material in which the powder of $Ti_{(1-x)}Al_xN$ (x=0.05~0.70) is further mixed with the above covered body.

Namely, this method is a production method of the titanium nitride aluminum based sintered material characterized in the following contents. Namely, in this production method, 5 to 40% of TiC whiskers by volume and 60 to 95% of $Ti_{(1-x)}Al_xN$ (x=0.05~0.70) powder by volume are prepared. The above TiC whiskers are covered with 0.25 to 12% of this $Ti_{(1-x)}Al_xN$ (x=0.05~0.70) so that a covered body of 5.25 to 52% by volume is produced. Next, this covered body is mixed with 48 to 94.75% of the remaining $Ti_{(1-x)}Al_xN$ (x=0.05~0.70) powder by volume so that a mixing raw material is produced. Next, this mixing raw material is sintered.

In this case, when a relatively large amount of $Ti_{(1-x)}Al_xN$ (x=0.05~0.70) is included in the mixing raw material, it is possible to show effects obtained in a using case of the above covered body while production cost of the covered body is reduced.

Namely, when the amount of $Ti_{(1-x)}Al_xN$ (x=0.05~0.70) for covering the TiC whiskers therewith is increased, its covering cost is increased.

Therefore, for example, when a large amount of $Ti_{(1-x)}Al_xN$ (x=0.05~0.70) is included in the mixing raw material, the covered body is produced within a relatively low range of the covering cost, that is, 0.25~12% by volume of $Ti_{(1-x)}Al_xN$ (x=0.05~0.70) and mixed with 48~94.75% by volume of the remaining material as separate powder.

Thus, the above effects in the using case of the covered body can be obtained while production cost is restrained.

The compounding ratio of the above TiC whiskers is set to range from 5 to 40% as mentioned above. When this compounding ratio is smaller than 5%, a problem exists in that no effects provided by compounding the TiC whiskers clearly appear as mentioned above. In contrast to this, when this compounding ratio exceeds 40%, a problem exists in that it is difficult to make the TiC whiskers close as mentioned above.

The TiC whiskers are covered with 0.25 to 12% of $Ti_{(1-x)}Al_xN$ (x=0.05~0.70) by volume on the whole. This means that 5 to 30% of the TiC whiskers by volume is covered with $Ti_{(1-x)}Al_xN$ (x=0.05~0.70). When a covering ratio of the TiC whiskers is smaller than 5%, a problem exists in that no covering effects easily appear. In contrast to this, when the covering ratio of the TiC whiskers exceeds 30%, a problem exists in that cost required to provide a uniform covering property and form the covered body is increased. Accordingly, the covered body is set to range from 5.25 to 52% by volume.

Powder of the remaining $Ti_{(1-x)}Al_xN$ (x=0.05~0.70) added as a separate substance is set to range from 48 to 94.75% by volume. The reasons for setting upper and lower limits of this range are similar to those in the above case.

The above x is preferably set to range from 0.05 to 0.15 or 0.50 to 0.70. Namely, the life of the obtained sintered material can be further lengthened by further limiting the above x in the above $Ti_{(1-x)}Al_xN$ (x=0.05~0.70) to the range from 0.05 to 0.15 or the range from 0.50 to 0.70.

It is not necessarily clear why the titanium nitride aluminum based sintered material shows a long life by limiting the value x to the above range. However, it is considered as influences that hardness of the above $Ti_{(1-x)}Al_xN$ becomes very high with 0.10(±0.02) as a first peak of the value x and 0.60(±0.02) as a second peak of the value x, and an oxidation resisting property of the above $Ti_{(1-x)}Al_xN$ becomes high with 0.60(±0.02) as a peak of the value x.

0.2 to 11.1% of an additive by volume constructed by $TiO_y$ (y=1~2) and/or $Al_2O_3$ is preferably externally added to the above titanium nitride aluminum based sintered material. Thus, the life of the titanium nitride aluminum based sintered material can be further lengthened.

$TiO_y$ is a titanium oxide such as $Ti_3O_5$, $Ti_4O_7$, etc. in which y can range from 1 to 2. The life of the titanium nitride aluminum based sintered material can be lengthened by externally adding this $TiO_y$ to the titanium nitride aluminum based sintered material within the range of y from 1 to 2. Further, no effects with respect to this lengthening using $TiO_y$ are almost changed within the above range of y from 1 to 2 so that these effects are preferable.

Similar to the case of $TiO_y$, the life of the titanium nitride aluminum based sintered material can be also lengthened by when $Al_2O_3$ is externally added to the titanium nitride aluminum based sintered material.

When external adding amounts of $TiO_y$ (y=1~2) and/or $Al_2O_3$ are smaller than 0.2%, a problem exists in that the above effects of the lengthening of the life are unclear. In contrast to this, when these external adding amounts exceeds 11.1%, a problem exists in that the life of the titanium nitride aluminum based sintered material is reversely shortened.

The next invention is a titanium nitride aluminum based sintered material obtained by the above excellent production method.

This titanium nitride aluminum based sintered material is characterized in that this sintered material is constructed by a sintered material of powder of $Ti_{(1-x)}Al_xN$ (x=0.05~0.70).

As mentioned above, this sintered material uses $Ti_{(1-x)}Al_xN$ (x=0.05~0.70) having excellent characteristics such as high hardness, etc. as a raw material so that the titanium nitride aluminum based sintered material has excellent durability and is cheaply produced.

Further, there is a titanium nitride aluminum based sintered material characterized in that this sintered material includes 60 to 95% of $Ti_{(1-x)}Al_xN$ (x=0.05~0.70) by volume and 5 to 40% of TiC whiskers by volume.

In this case, it is possible to obtain a sintered material having excellent durability and tenacity. The reasons for limiting a compounding ratio of each of the raw materials are similar to those in the above case.

The above x is preferably set to range from 0.05 to 0.15 or range from 0.50 to 0.70. In this case, the life of the titanium nitride aluminum based sintered material can be lengthened as mentioned above. The reasons for limiting the above x are similar to those in the above case.

0.2 to 11.1% of an additive by volume constructed by $TiO_y$ (y=1~2) and/or $Al_2O$ is preferably externally added to the above titanium nitride aluminum based sintered material. In this case, the life of the titanium nitride aluminum based sintered material can be further lengthened as mentioned above. The reasons for limiting adding amounts of these additives are similar to those in the above case.

As described above, the present invention provides a titanium nitride aluminum based sintered material having excellent durability and able to be cheaply produced and cut spheroidal graphite cast iron at high speed and be used as a cutting tool material having a long life, and also provides a production method of this titanium nitride aluminum based sintered material.

EMBODIMENTS

Embodiment 1

A titanium nitride aluminum based sintered material and its production method in an embodiment of the present invention will be explained by using FIGS. 1 to 3.

In this example, titanium nitride aluminum based sintered materials having various kinds of compositions are produced by various kinds of methods. A cutting tool is constructed by using each of these titanium nitride aluminum based sintered materials as a cutting tool material and a life lengthening property of this cutting tool is evaluated. Tables 1 to 3 show a production method of $Ti_{(1-x)}Al_xN$ in the produced titanium nitride aluminum based sintered material, a compounding amount of each of raw materials, a production condition, evaluated results described later, etc.

Manufacture of the cutting tool material using the titanium nitride aluminum based sintered material will first be explained. In this example, the cutting tool material is mainly produced by three kinds of production methods.

In a first production method, only powder of $Ti_{(1-x)}Al_xN$ is used as a raw material and is sintered.

Concretely, a thin film of $Ti_{(1-x)}Al_xN$ having various kinds of x-values by a plasma CVD method is first produced. In the plasma CVD method in this example, $N_2$, $AlCl_3$ and $TiCl_4$ are used as raw material gases of this thin film, and the above x-values are adjusted by adjusting a gaseous partial pressure ratio of $AlCl_3/TiCl_4$. Argon (Ar) is used as a carrier gas.

In the other conditions, pressure is set to range from $1.0 \times 10^{-2}$ to $1.0 \times 10^{-3}$ torr and temperature is set to range from about 400 to about 800° C.

$Ti_{(1-x)}Al_xN$ is evaporated onto a substrate constructed by aluminum (Al) or $SiO_2$ and its thin film is produced. Next, after this thin film is separated from the substrate, the thin film is crushed by a crusher made of SiC so that powder of $Ti_{(1-x)}Al_xN$ having an average particle diameter of 1 μm is obtained.

Next, in this example, the above mixing raw material is overlapped with a plate for a base seat separately prepared and is hot press-sintered. Thus, a cutting tool material having the titanium nitride aluminum based sintered material laminated with the base seat plate is obtained.

The above hot press-sintering is performed by an argon (Ar)—$N_2$ flow hot press using Ar—$N_2$ as a protecting atmosphere gas. In a condition of this flow hot press, pressure is set to 0.03 GPa and temperature is set to 1800° C. and a sintering time is set to 120 minutes. The above plate for a basic seat is formed by molding WC powder using a die. This WC powder includes 10% of Co powder by weight.

In this example, cutting tool materials having various kinds of compositions provided by changing the above value x of $Ti_{(1-x)}Al_xN$ are obtained as shown in sample Nos. E1, E16 and C2 to C4 in the tables 1 to 3. The sample Nos. C2 to C4 show comparing materials prepared for comparison with the present invention.

Next, in a second production method, a mixture provided by mixing powder of $Ti_{(1-x)}Al_xN$ with TiC whiskers is sintered.

The powder of $Ti_{(1-x)}Al_xN$ is produced by the plasma CVD method or the ion plating (PVD) method.

The plasma CVD method is similar to that in the above first production method.

In the ion plating method, titanium (Ti) powder and aluminum (Al) powder are sintered under vacuum by changing the value x of $Ti_{(1-x)}Al_xN$ and ion plating is performed by using each of these sintered powders as a target of the ion plating. A production method of each of these powders is similar to that in the plasma CVD method.

The TiC whiskers having 2 μm in whisker average diameter and 50 μm in average length are used.

$TiO_y$ powder and $Al_2O_3$ powder are added to the $Ti_{(1-x)}Al_xN$ powder and the TiC whiskers in accordance with necessity. These powders and the TiC whiskers are mixed with each other by a ball mill for three hours and are then dried and molded by a die to obtain a molding. This molding is hot press-sintered in a state in which the molding is laminated with a plate for a base seat similar to that in the above case.

Thus, cutting tool materials having various kinds of compositions shown in sample Nos. E2, E17 and C5 to C7 are obtained as shown in the tables 1 to 3. The sample Nos. C5 to C7 show comparing materials.

In a third production method, $Ti_{(1-x)}Al_xN$ powder, TiC whiskers and a covered body obtained by covering the TiC whiskers with $Ti_{(1-x)}Al_xN$ are mixed with each other and are sintered.

The $Ti_{(1-x)}Al_xN$ powder is produced by the above plasma CVD method or the above ion plating method.

The TiC whiskers are similar to those in the above second production method.

In the production method of the above covered body, a saucer capable of applying supersonic vibrations to the TiC whiskers having 1.2 μm in average diameter and 30 μm in average length is used instead of the above substrate in the above plasma CVD method or the above ion plating method.

Then, $Ti_{(1-x)}Al_xN$ is directly generated on surfaces of the TiC whiskers so that the above covered body is produced.

In the production method of the covered body, ion sputtering (PVD) is also used instead of the above plasma CVD or the above ion plating. Concretely, this ion sputtering is performed in a condition in which pressure ranges from $1.0 \times 10^{-2}$ to $1.0 \times 10^{-3}$ torr and temperature ranges from 200 to 600° C.

Next, $TiO_y$ powder and $Al_2O_3$ powder are added to the covered body, $Ti_{(1-x)}Al_xN$ powders and the TiC whiskers in accordance with necessity. The covered body, these powders and the TiC whiskers are mixed with each other and are then molded by a die to obtain a molding. This molding is hot press-sintered in a state in which the molding is laminated with a plate for a base seat similar to that in the above case. Thus, a cutting tool material is obtained.

Thus, samples shown by sample Nos. E3 to E15, E18 and E19 are obtained as shown in the tables 1 to 3.

The value x of $Ti_{(1-x)}Al_xN$ in the titanium nitride aluminum based sintered material obtained in each of the above production methods is quantitatively determined by EDX (energy dispersion type X-ray analysis).

Figure 2:
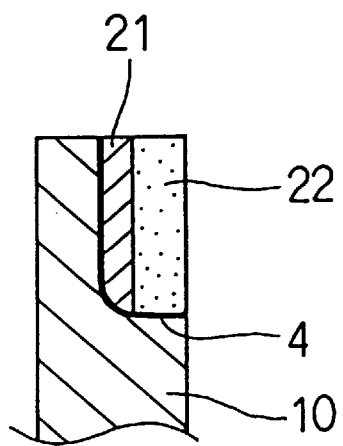
FIG. 2 is an explanatory view showing S-section of the cutting tool in FIG. 1 according to Embodiment 1.
Figure 3:
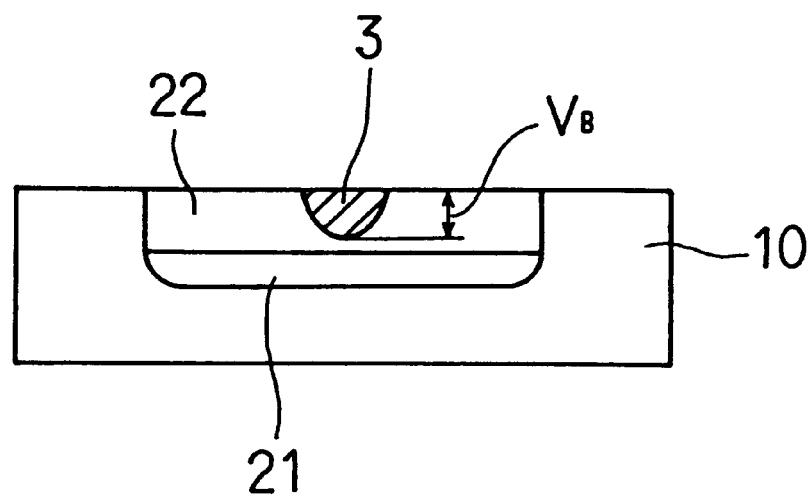
FIG. 3 is a plan view showing wearing of an escaping face according to Embodiment 1.

As shown in FIGS. 1 and 2, each of the cutting tool materials (sample Nos. E1 to E19 and C2 to C7) obtained by each of the above production methods is soldered and joined to a base material 10 made of a cemented carbide and is processed as a cutting tool 1 having a shape of JIS (Japanese Industrial Standard) CCGW09T304. Namely, as shown in FIG. 2, in the cutting tool 1, a cutting tool material 2 is joined to an end tip of the base material 10 by a soldering material 4. The cutting tool material 2 is formed by laminating a titanium nitride aluminum based sintered material 22 with a plate 21 for a base seat.

Next, a cutting test is made by using each obtained cutting tool 1 in the following condition. Then, as shown in FIG. 3, the wearing amount $V_B$ (mm) of an escaping face 3 of the cutting tool 1 is measured and is set to an index of a long life.

Cutting Condition

Cut material: spheroidal graphite cast iron round bar (FCD450-10, hardness: Hv169) having 110 mm in outside diameter φ, cutting speed: 250 m/min, feed: 0.15 mm/rev, depth of cut: 0.3 mm, cutting oil: Chemicool SR-1 (trade mark), cutting length: 10 km.

The results of the cutting test are shown in the tables 1 to 3.

A cubic boron nitride sintered body tool conventionally used and commercially sold is prepared for comparison (sample No. C1) and is similarly tested. Sample Nos. C2 to C4 show comparing materials in which the value x of $Ti_{(1-x)}Al_xN$ is dislocated from its range in the present invention. Sample No. C5 shows a comparing material for investigating a suitable compounding ratio of the TiC whiskers. Sample Nos. C6 and C7 show comparing materials for investigating suitable compounding ratios of $TiO_y$ and $Al_2O_3$.

As clearly seen from the tables 1 to 3, each of the sample Nos. E1 to E19 obtained in the present invention shows a preeminent long life equivalent to a conventional cubic boron nitride based ultrahigh pressure sintered body tool commercially sold and also shows a notable long life in comparison with the other comparing examples.

Thus, it is possible to provide a cheaply produced cutting tool in which high speed cutting of the spheroidal graphite cast iron conventionally desired can be realized in a long life, thereby contributing to a great improvement in productivity.

In the cutting tool material in this example, the spheroidal graphite cast iron difficult to be processed among cast iron can be processed at high speed such that the spheroidal graphite cast iron has a long life. Accordingly, the cutting tool material can be used while this cutting tool material also shows excellent performance with respect to general cast iron (FC material) relatively easy to be processed.

TABLE 1

| sample No. | $Ti_{1-x}Al_xN$ method | $Ti_{1-x}Al_xN$ x-value | TiC whiskers coating amount Vol % | powder compounding amount Vol % | compounding amount TiC whiskers Vol % | compounding amount $TiO_y$ Vol % | compounding amount $Al_2O_3$ Vol % | sintering condition temperature ° C. | sintering condition relative density % | cutting test $V_B$ wearing amount mm |
|---|---|---|---|---|---|---|---|---|---|---|
| E1 | A | 0.1 | — | 100 | — | — | — | 1850 | 100 | 0.195 |
| E2 | A | 0.1 | — | 90 | 10 | — | — | 1800 | 99.6 | 0.190 |
| E3 | A | 0.1 | 4 | 76 | 20 | — | — | 1800 | 99.4 | 0.183 |
| E4 | B | 0.1 | 2 | 78 | 20 | — | — | 1850 | 99.1 | 0.186 |
| E5 | B | 0.1 | 2.1 | 76.8 | 21.1 | — | 5.3 | 1900 | 99.3 | 0.181 |
| E6 | C | 0.1 | 1.1 | 76.7 | 22.2 | 5.6 | 5.6 | 1900 | 99.6 | 0.178 |
| E7 | C | 0.1 | 3.2 | 65.3 | 31.6 | — | 5.3 | 1850 | 98.6 | 0.182 |
| E8 | C | 0.1 | 2.2 | 53.3 | 44.4 | 5.6 | 5.6 | 1900 | 98.3 | 0.188 |
| E9 | A | 0.2 | 1.1 | 83.4 | 10.5 | — | 5.3 | 1800 | 99.5 | 0.223 |
| E10 | A | 0.3 | 2.1 | 76.8 | 21.1 | 5.3 | — | 1850 | 99.3 | 0.214 |

< $Ti_{(1-x)}Al_xN$ manufacturing methods >
A: plasma CVD method,
B: ion plating method (PVD),
C: ion sputtering method (PVD),

TABLE 2

| sample No. | method | $Ti_{(1-x)}Al_xN$ x-value | TiC whiskers coating amount Vol % | powder compounding amount Vol % | compounding amount TiC whiskers Vol % | $TiO_y$ Vol % | $Al_2O_3$ Vol % | sintering condition temperature °C. | relative density % | cutting test $V_B$ wearing amount mm |
|---|---|---|---|---|---|---|---|---|---|---|
| E11 | A | 0.4 | 3.3 | 63.3 | 33.3 | 5.6 | 5.6 | 1900 | 98.6 | 0.220 |
| E12 | B | 0.5 | 1.1 | 77.8 | 21.1 | 5.3 | — | 1850 | 99.2 | 0.211 |
| E13 | B | 0.6 | 2.2 | 75.6 | 22.2 | 5.6 | 5.6 | 1850 | 99.3 | 0.200 |
| E14 | C | 0.6 | 1.1 | 87.8 | 11.1 | 5.6 | 5.6 | 1800 | 99.8 | 0.207 |
| E15 | C | 0.6 | 2.1 | 76.8 | 21.1 | — | 5.3 | 1850 | 98.8 | 0.203 |
| E16 | A | 0.6 | — | 100 | — | — | — | 1850 | 100 | 0.209 |
| E17 | A | 0.6 | — | 90 | 10 | — | — | 1800 | 99.6 | 0.206 |
| E18 | A | 0.6 | 2 | 78 | 20 | — | — | 1900 | 99.5 | 0.205 |
| E19 | A | 0.6 | 1.1 | 77.9 | 21.1 | 5.3 | — | 1850 | 99.3 | 0.203 |

TABLE 3

| sample No. | method | $Ti_{(1-x)}Al_xN$ x-value | TiC whiskers coating amount Vol % | powder compounding amount Vol % | compounding amount TiC whiskers Vol % | $TiO_y$ Vol % | $Al_2O_3$ Vol % | sintering condition temperature °C. | relative density % | cutting test $V_B$ wearing amount mm |
|---|---|---|---|---|---|---|---|---|---|---|
| C1 | | | | comarcially sold (cBN) | | | | | | 0.201 |
| C2 | A | 0.8 | — | 100 | — | — | — | 1850 | 100 | 0.423 |
| C3 | A | 0 | — | 100 | — | — | — | 1850 | 100 | 0.438 |
| C4 | A | 0.03 | — | 100 | — | — | — | 1850 | 100 | 0.282 |
| C5 | B | 0.2 | — | 50 | 50 | — | — | 1900 | 91.2 | 0.373 |
| C6 | B | 0.3 | — | 75 | 25 | 25 | — | 1800 | 99.7 | 0.252 |
| C7 | B | 0.1 | — | 75 | 25 | — | 25 | 1800 | 99.6 | 0.288 |

What is claimed is:

1. A method of producing a titanium nitride aluminum sintered material comprising
    sintering a powder consisting essentially of $Ti_{(1-x)}Al_xN$ (x=0.05~0.70).

2. A method of producing a titanium nitride aluminum sintered material comprising
    sintering a raw material consisting essentially of 60 to 95% of $Ti_{(1-x)}Al_xN$ (x=0.05~0.70) by volume and 5 to 40% of TiC whiskers by volume.

3. A method of producing a titanium nitride aluminum sintered material comprising
    covering surfaces of TiC whiskers with a powder consisting essentially of $Ti_{(1-x)}Al_xN$ (x=0.05~0.70) to form coated whiskers,
    manufacturing a coated body comprising the coated whiskers, and
    sintering the coated body.

4. The method as claimed in claim 3, wherein said coated body includes 60 to 95% of said $Ti_{(1-x)}Al_xN$ (x=0.05~0.70) by volume and 5 to 40% of said TiC whiskers by volume.

5. A method of producing a titanium nitride aluminum sintered material comprising
    preparing 5 to 40% of TiC whiskers by volume and a powder consisting essentially of 60 to 95% of $Ti_{(1-x)}Al_xN$ (x=0.05~0.70) by volume,
    covering said TiC whiskers with 0.25 to 12% of the $Ti_{(1-x)}Al_xN$ (x=0.05~0.70) to form coated whiskers,
    producing a coated body of 5.25 to 52% by volume comprising the coated whiskers,
    mixing the coated body and 48 to 94.75% of the remaining $Ti_{(1-x)}Al_xN$ (x=0.05~0.70) powder by volume to produce a mixing raw material, and
    sintering the mixing raw material.

6. The method as claimed in claim 1, wherein said x ranges from 0.05 to 0.15, or ranges from 0.50 to 0.70.

7. The method as claimed in claim 2, wherein said x ranges from 0.05 to 0.15, or ranges from 0.50 to 0.70.

8. The method as claimed in claim 3, wherein said x ranges from 0.05 to 0.15, or ranges from 0.50 to 0.70.

9. The method as claimed in claim 5, wherein said x ranges from 0.05 to 0.15, or ranges from 0.50 to 0.70.

10. The method as claimed in claim 1, wherein 0.2 to 11.1% of an additive by volume constructed by $TiO_y$ (y=1~2) and/or $Al_2O_3$ is externally added to said titanium nitride aluminum sintered material.

11. The method as claimed in claim 2, wherein 0.2 to 11.1% of an additive by volume constructed by $TiO_y$ (y=1~2) and/or $Al_2O_3$ is externally added to said titanium nitride aluminum sintered material.

12. The method as claimed in claim 3, wherein 0.2 to 11.1% of an additive by volume constructed by $TiO_y$ (y=1~2) and/or $Al_2O_3$ is externally added to said titanium nitride aluminum sintered material.

13. The method as claimed in claim 5, wherein 0.2 to 11.1% of an additive by volume constructed by $TiO_y$ (y=1~2) and/or $Al_2O_3$ is externally added to said titanium nitride aluminum sintered material.

14. A titanium nitride aluminum sintered material produced by a process comprising mixing a powder consisting essentially of $Ti_{(1-x)}Al_xN$ (x=0.05~0.70) and 0.2 to 11.1% by volume of an additive consisting of $TiO_y$ (y=1~2) and/or $Al_2O_3$ to form a mixture, and sintering the mixture.

15. A titanium nitride aluminum sintered material consisting essentially of 60 to 95% of $Ti_{(1-x)}Al_xN$ (x=0.05~0.70) by volume and 5 to 40% of TiC whiskers by volume.

16. The titanium nitride aluminum sintered material as claimed in claim 14, wherein said x ranges from 0.05 to 0.15, or ranges from 0.50 to 0.70.

17. The titanium nitride aluminum sintered material as claimed in claim 15, wherein said x ranges from 0.05 to 0.15, or ranges from 0.50 to 0.70.

18. The titanium nitride aluminum sintered material as claimed in claim 15, wherein 0.2 to 11.1% of an additive by volume comprised of $TiO_y$ (y=1~2) and/or $Al_2O_3$ is externally added to said titanium nitride aluminum sintered material.

19. The method according to claim 1, comprising sintering a powder consisting of $Ti_{(1-x)}Al_xN$ (x=0.05~0.70).

20. The method according to claim 2, wherein the 60 to 95% of $Ti_{(1-x)}Al_xN$ (x=0.05~0.70) consists of Ti, Al and N.

21. The method according to claim 3, wherein the coated whiskers are formed by covering the surfaces of TiC whiskers with a powder consisting of $Ti_{(1-x)}Al_xN$ (x=0.05~0.70).

22. The method according to claim 5, wherein the 60 to 95% of $Ti_{(1-x)}Al_xN$ (x=0.05~0.70) consists of Ti, Al and N.

* * * * *